Oct. 6, 1970　　　M. A. HABEGGER ETAL　　　3,533,104
HEAD-UP DISPLAY SYSTEM

Filed May 17, 1968　　　　　　　　　　　　　　　11 Sheets-Sheet 1

INVENTORS
MILLARD A. HABEGGER
THOMAS J. HARRIS
GLEN T. SINCERBOX

BY *Robert W. Furay*
ATTORNEY

Oct. 6, 1970   M. A. HABEGGER ETAL   3,533,104
HEAD-UP DISPLAY SYSTEM
Filed May 17, 1968   11 Sheets-Sheet 3

Oct. 6, 1970    M. A. HABEGGER ETAL    3,533,104
HEAD-UP DISPLAY SYSTEM

Filed May 17, 1968    11 Sheets-Sheet 8

United States Patent Office 3,533,104
Patented Oct. 6, 1970

3,533,104
HEAD-UP DISPLAY SYSTEM
Millard A. Habegger and Thomas J. Harris, Poughkeepsie, and Glenn T. Sincerbox, Wappingers Falls, N.Y., assignors to International Business Machines Corporation, Armonk, N.Y., a corporation of New York
Filed May 17, 1968, Ser. No. 729,973
Int. Cl. G01s 9/00
U.S. Cl. 343—6                                                     10 Claims

ABSTRACT OF THE DISCLOSURE

A head-up display system is disclosed for an application which requires the presentation of visual information that can be continuously altered with time. An image of a real-world object is presented to a vehicle operator corresponding to the vehicle's actual position and attitude with reference to the real-world object. Four methods of displaying an image of the object to the vehicle operator are disclosed. Two methods of image display originate from a holographic record produced by photographing a model of the real-world object. One holographic method utilizes a virtual image projection and the other utilizes a real image projection. Two other embodiments of the display system utilize entirely optical means including display of an image created by televising a view of a model and another method which utilizes a lens system for projecting an image of a model.

BACKGROUND OF THE INVENTION

The invention herein described was made in the course of or under a contract or sub-contract thereunder with the Office of Naval Research.

This invention relates to a head-up display system for a vehicle operator and in particular to a system which must provide a simulation of the real-world exterior to the vehicle, and at the same time, represent any change in attitude with respect to a predetermined segment of the real-world.

The first airborne head-up display was a simple optical gunsight consisting of an illuminated crosshair reticle, a collimating lens, and a beam splitter mounted at 45° to the pilot's line of sight. This simple system presented the pilot with a luminous image that appeared at virtual infinity directly in front of the aircraft. The advantages of such a system were that the pilot could receive visual information without diverting his attention from the outside world, and without changing his eye focus. Also, the information that was displayed on a fixed spatial relationship to the aircraft's principal axes, regardless of the pilot's head position.

When a CRT screen was first substituted for the illuminated reticle, the old gunsight became a contact analog head-up display, which had an information presentation capability limited only by the capacity of the computer that fed it. Despite continuing advances in display technology, present head-up displays are limited to providing highly symbolic presentations, which require a large degree of mental interpretation. Typical display formates consist of crude, computer-generated line images, which are sometimes augmented by alphanumeric data. Some development work is being done on continuous-tone, computer-generated imagery intended to simulate a real-world scene during conditions of reduced visibility. Such imagery is two dimensional, and its complexity and refresh rate are still ultimately limited by the capacity of the computer that generates it.

SUMMARY OF THE INVENTION

Any head-up display system which must project an image of a real-world object should be able to manipulate the image in 6 degrees of freedom. Although the present invention discloses a system for use in an aircraft as an aid to landing aboard an aircraft carrier during periods of no visibility, the invention has applicability to any system which is to display a real object being approached by any particular vehicle. Further, it will become apparent that the present invention which is capable of assisting in landings aboard an aircraft carrier, can also be implemented in a trainer environment with little modification to the display system. In the case of aircraft landings aboard a carrier, the 6 degrees of freedom which must be continuously varied in the projected image include range to the object, image pitch and image yaw to represent the aircrafts position relative to the carrier on the approach path, pitch of the aircraft, yaw of the aircraft, and roll of the aircraft.

Recent developments in holography suggest a greatly accelerated evolution of display systems. Holographic images are three-dimensional images and exhibit all the depth and parallax of their real-world counterparts. Their realism and detail are not limited by a computers storage capacity. Because they are truly three-dimensional, holographic images may be manipulated in 6 degrees of freedom to simulate the relative motion of the scenes that they represent. This manipulation may be done directly, without going through a coordinate transform computation for each point in the image, as is required with contact analog imagery.

In the present invention, two holographic techniques and two optical techniques for projecting an image all utilize information presently generated during the time an aircraft is approaching a landing on a carrier. This information is utilized to manipulate the image in the 6 degrees of freedom required. Aboard the carrier, information from the shipboard radar with regard to the position of the aircraft on the approach path is transmitted as data to the aircraft and provides information as to range, vertical (image pitch) and horizontal (image yaw) position of the aircraft with respect to a normal approach path. The range information is utilized to alter the size of the image projected, and the vertical and horizontal deviations from the glide path are utilized to alter the perspective view of the image presented to the pilot in accordance with the vehicles position relative to the carrier. Search radar aboard the aircraft which is bore sight-refreenced, rather than horizon referenced, and tracking the carrier, provides information to the image display with regard to the pitch and yaw of the aircraft relative to the desired glide path. The final degree of freedom required is a rotation of the image in accordance with the roll of the aircraft which is readily available from the aircraft's attitude reference system (horizon).

It is an object of the present invention to provide a head-up display system which manipulates a three- dimensional image of a real-world object in 6 degrees of freedom utilizing existing signalling means between the object and vehicle approaching the object.

It is an additional object of this invention to provide a head-up display system wherein the image projected into the view of a vehicle operator is a replica of the three-dimensional real-world object as opposed to a artificially generated approximation of the object.

DESCRIPTION OF PREFERRED EMBODIMENTS

General display system concept

Figure 1:
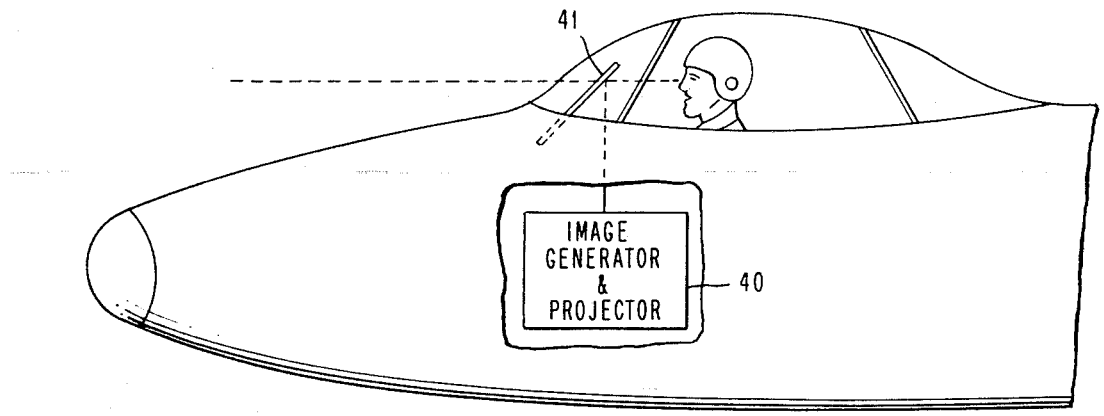
FIG. 1 shows the general environment for the head-up display system.

The present invention has as its environment an aircraft or vehicle being maneuvered by a operator in what can be considered a normal approach to an aircraft carrier or other real objects. The primary purpose of the present invention, as shown in FIG. 1, is to provide an Image Generator and Projector 40 in the vehicle which projects a properly selected and translated view of a real object through a beam splitter 41 in the line of sight of the vehicle operator. When properly generated and projected, the image will appear at infinity to the operator and will have a size, perspective, and translation in the field of view exactly corresponding to that which the real object would have. The Image Generator and Projector 40 of the present invention takes four forms. Two of these include optical means for generating and projecting an image and the other two incorporate holographic techniques.

Figure 2:
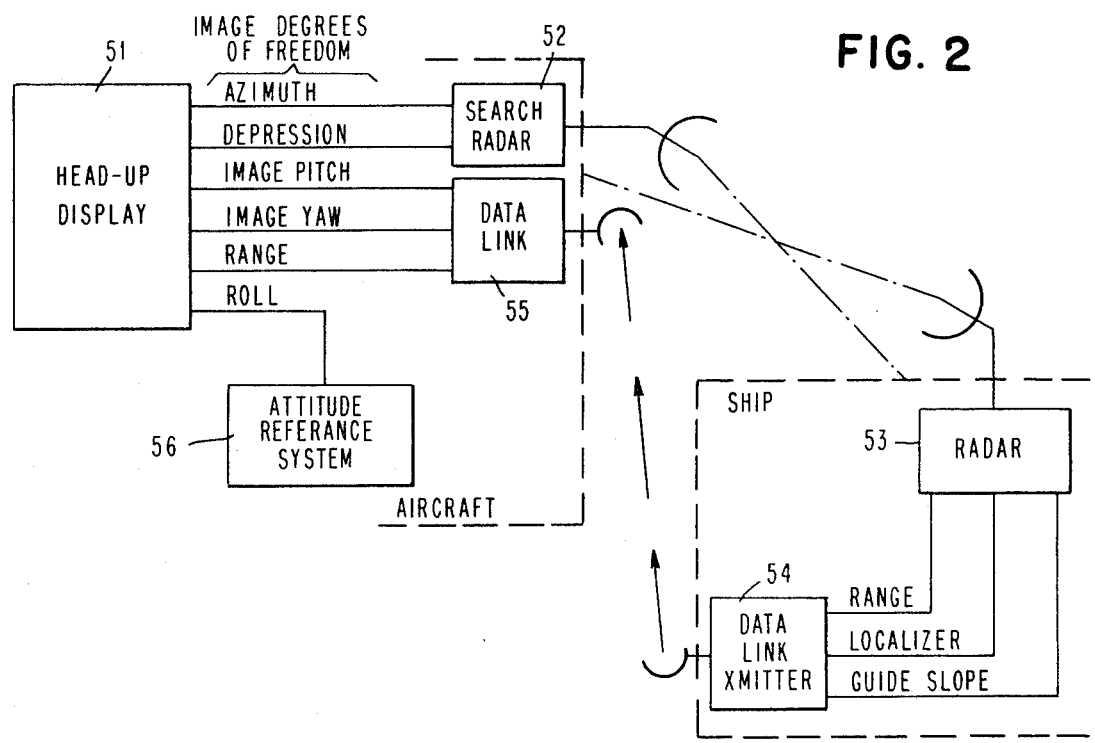
FIG. 2 depicts the radar and data links between an aircraft and a carrier during a landing approach.

In all four embodiments of the head-up display system, the image projected to the operator must be manipulated in 6 degrees of freedom. FIG. 2 depicts the presently existing radar and data links between an aircraft carrier and an approaching aircraft during landing operations. The Head-Up Display 51 must be provided with information to provide the 6 degrees of freedom in the image projected. The information labeled azimuth and depression coincide with the yaw and pitch attitude of the aircraft. The aircraft's search radar 52 can be locked on the aircraft carrier. As the aircraft pitches and yaws, information generated by the search radar provides the necessary information to cause a selected image to be translated in vertical and horizontal directions as would be the case if the operator were viewing the real object through the windshield. The radar 53 on the aircraft carrier is utilized during landing operations to generate information concerning the aircraft's position relative to a normal approach path. The information generated from the ships radar 53 includes range, localizer (horizontal) and glide slope (vertical) information. This information is transmitted to the aircraft by a data link transmitter 54 and is received by the aircraft's data link 55. The range information is utilized to alter the size of the image projected to the operator. In order to generate a proper view of the image projected, the position of the aircraft relative to the proper approach path is converted to information which causes the image to appear to pitch and yaw. This information selects the proper perspective view of the image for projection to the operator. The final item of information required to manipulate the image projected is roll information of the aircraft which can be obtained from the Attitude Reference System 56 in the aircraft. The result of providing this information to the head-up display 51 causes an image to be projected to the beam splitter 41 having the proper perspective and size in accordance with the aircrafts position relative to the carrier and the remaining information is utilized to translate the image in vertical and horizontal directions and roll in accordance with the aircrafts attitude.

Holographic recording and reconstruction

FIGS. 3 through 8 will be referred to in order to discuss generally the manner in which a hologram of a three-dimensional object is produced and now virtual or real images can be reconstructed from the hologram.

Figure 3:
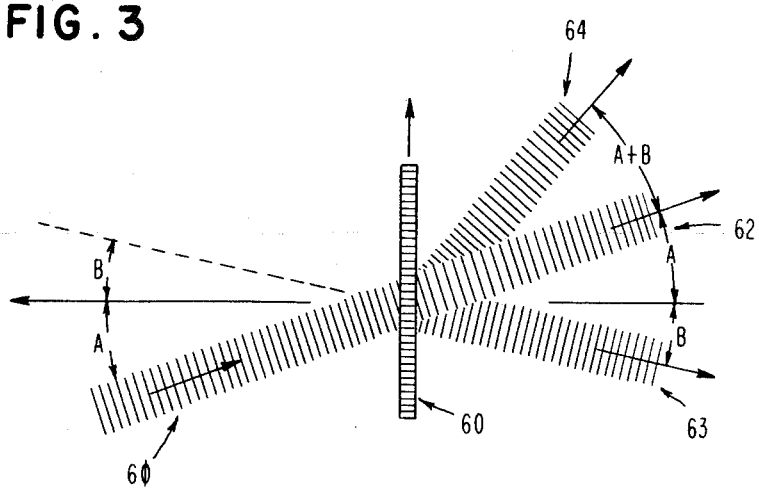
FIG. 3 depicts the various beams created when reconstructing an image previously recorded by interference photography.
Figure 4:
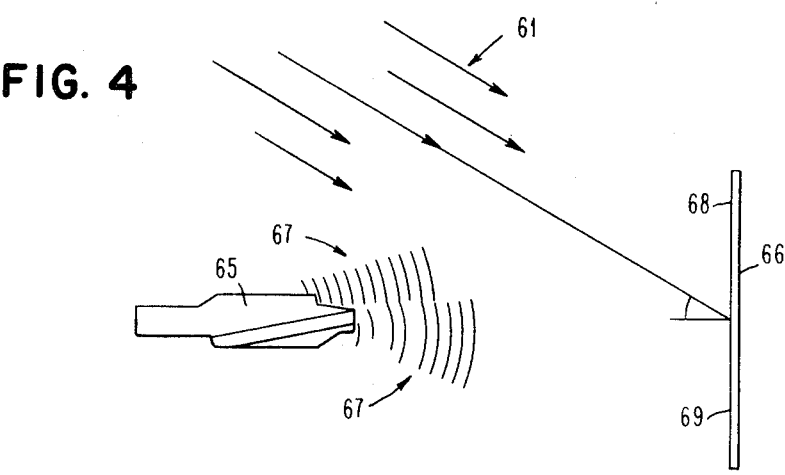
FIG. 4 depicts the manner in which a holographic recording of a three-dimensional object can be made.

The theory behind holographic recording is well known. Basically, it is the photographic recording of interference patterns, created in a photographic emulsion, between a reference light beam and a signal light beam from an object to be recorded. FIG. 3 depicts the light beams created when a previously recorded hologram 60 is illuminated by a reconstruction beam 61 corresponding to the reference beam utilized during the recorded process. A light beam 62, referred to as the zero-order beam contains no useful information. The reference beam during recording and the reconstruction beam 61 are made to strike the hologram 60 at an angle A from normal. The light beam 63, referred to as the virtual image beam, produces a virtual image of the object recorded appearing to be at the location the object had during the recording process. The beam 63, assumes an angle B from the normal axis of the hologram 60. Another light beam 64 is produced, referred to as the real image beam. The angle between the real image beam 64 and the zero-order beam 62 is A plus B. The difference in projection techniques in subsequent descriptions of preferred embodiments of the invention, relate to the manner in which the real image beam is utilized as opposed to the virtual image beam. When utilizing the virtual image beam 63, the image appears on the opposite side of the hologram 60 from the viewer at a location the same as that occupied by the object being photographed. In the case of the real image beam, a focused or real image of the object is produced in space on the observer side of the hologram. FIG. 3 shows the reference beam 61 as a plane wave source reconstructing an interference pattern recorded from a point source of signal waves at infinity, also having plane waves. In FIG. 4, there is depicted the difference in what the photographic emulsion will record in the way of interference patterns produced by a three-dimensional object. If a three-dimensional object 65 is placed at a finite distance away from a photographic emulsion plate 66 and the plate 66 is illuminated with a light beam 61, the interference patterns recorded will vary in accordance with the angles of interference between the reference light beam 61 and each of a plurality of point sources of reflected light 67. The upper portion 68 of the plate 66, will record an interference pattern which is created by point sources of reflected light rays 67 corresponding to the starboard side of the aircraft carrier object 65. In a like manner, the lower portion 69 of the photographic emulsion will record a series of interference patterns dictated by the angles of incidence of the reference light 61 and point sources of light 67 emanating from the port side of the aircraft carrier object.

Figure 5:
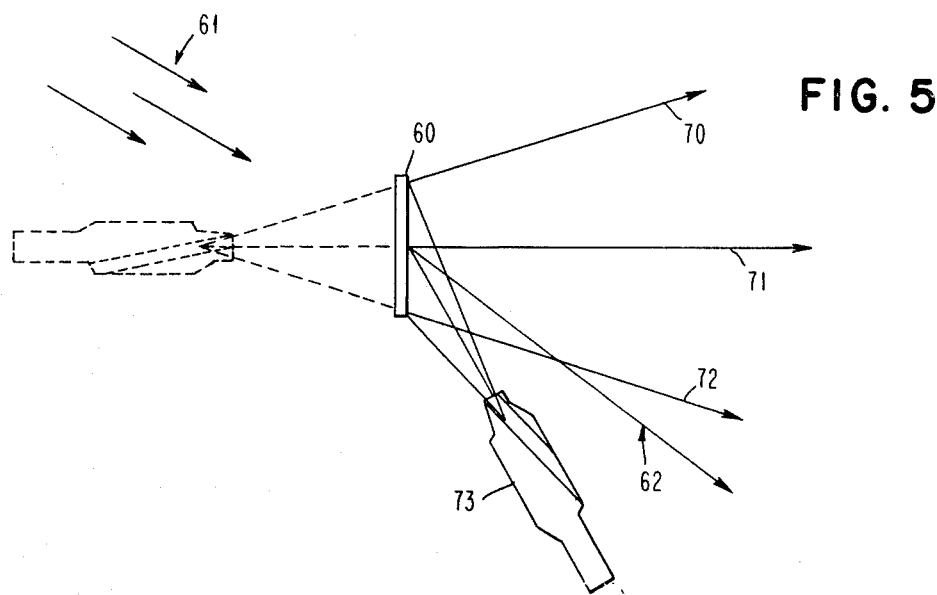
FIG. 5 depicts reconstructed images from a hologram.

FIG. 5 shows a relationship between a virtual image and a real image when a previously recorded hologram 60 is illuminated with a reference light beam 61 corresponding to the reference light beam used during recording. The zero-order beam is shown at 62. If an observer looked through the hologram 60 along the lines of sight 70, 71, or 72, he would see a virtual image of the originally recorded object appearing to be positioned at the same location the object had at the time of recording. Further, the image observed would have the perspective suggested by the lines of sight shown namely from the starboard side (70), astern (71), and the port side (72) of the object.

A real image 73 of the three-dimensional object recorded will produce a focused image which can be intercepted and displayed and will be located on the same side of the hologram 60 as an observer.

Figure 6:
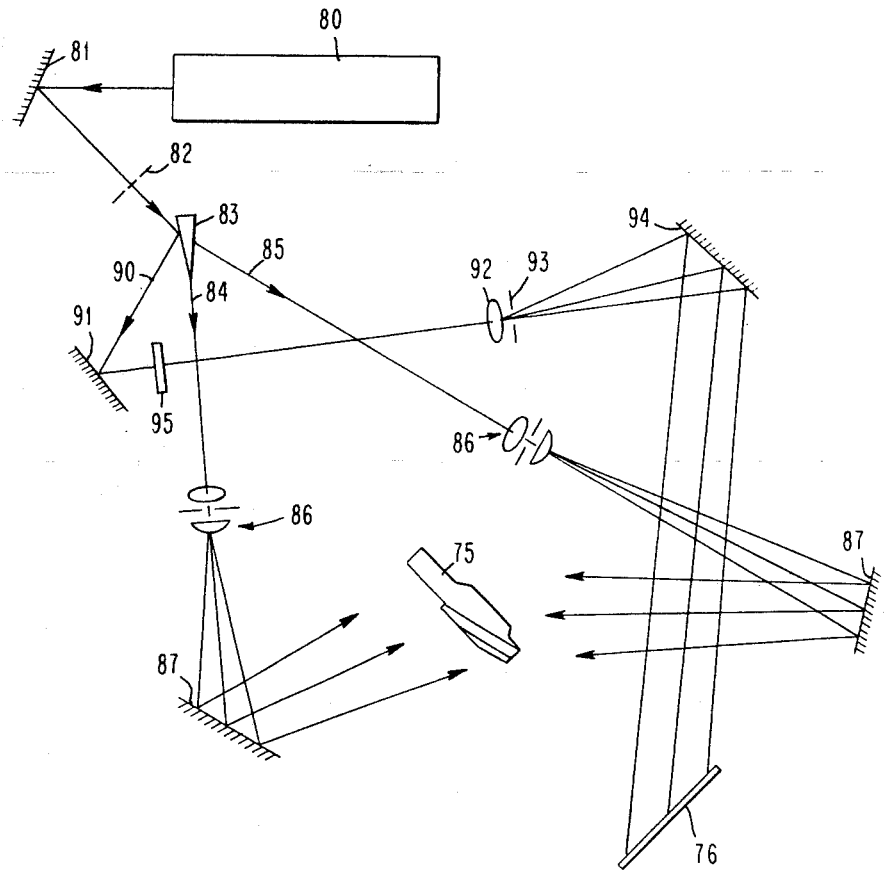
FIGS. 6, 7 and 8 are schematic representations of the manner in which a photographic plate is exposed to interfering light patterns to produce a hologram.

FIG. 6 depicts a method and structure utilized for creating a holographic record to be used to produce either a virtual or real image projection display system. A photographic record of an aircraft carrier model 75 is made on a photographic emulsion plate 76. The plate 76 can measure 8 inches by 10 inches. The carrier model 75 used is approximately 10 inches long and its scale is 1:1250. Model 75 is placed approximately 16 inches in front of the plate 76. The view of the carrier recorded on the hologram is determined by the holograms plate size and the distance from the plate to the carrier model. For this example, the total horizontal angular view will be approximately 36° and the vertical angular view approximately 28°.

The selection of recording parameters involves both theoretical and practical considerations and must be a compromise between them. The physical positioning of the optical components in the exposure system is, to a large degree, determined by the desired angle between the signal and reference beams. Hence, once the object to b recorded has been selcted and the hologram to object separation specified, the angular range over which the reference beam may be entered is fixed. The minimum angle is fixed by the extent of the object so as not to cast a shadow on th recording medium. The maximum angle is usually constrained by the physical size of the work surface. For a particular application, it was found convenient to introduce the reference beam at an angle of 45° to the film normal. A decision must also be made as to how many beams of light will be required to illluminate the object. This will be determined by the extent of the angular field over which the object is to be viewed and the extent of the object itself. The first consideration is to illuminate regions of the object that would normally be shadowed by a single beam illumination. The second factor is to assure that light from all regions of the object will be coherent with the reference beam and hence, insure interference. Once the required number of beams has been determined, the means for creating them from a single laser beam may be considered. This may be accomplished from a single beam splitter, prism wedge or deflection grating up to a complex arrangement of many of these items together with mirrors. It was found that three beams would be required and these were conveniently obtained from the three beams cerated by a prism wedge. That is, the transmitted beam and the first surface reflection were used to illuminate the object, and the weaker second surface reflection was used for the reference beam.

FIG. 6 shows all the structure required for exposing the photographic emulsion 76. A source 80 produces a coherent light beam reflected from a mirror surface 81 through a time shutter arrangement 82. The single beam is then split into three separate beams by a prism beam splitter 83. Beams 84 and 85, which become the model illuminating beams are each passed through an optical system 86 including a microscope objective, spatial filter, and cylindrical lens. The diverged illuminating beams are reflected from mirror surfaces 87 to provide the required illumination of the aircraft carrier model 75.

The beam 90 emanating from the beam splitter 83 is reflected from a mirror surface 91. The beam 90 becomes the reference beam for the recording process. The reference beam is diverged with a microscope objective 92 to provide for illumination of the entire recording film. It is passed through a spatial filter 93 in order to provide a uniform wavefront. The diverged reference beam is then reflected from a mirror surface 94 in order to illuminate the photographic emulsion plate 76 at the proper angle. The amount of illumination at the recording plane caused by the reference wavefront is controlled by inserting a neutral-density filter 95 into the reference beam. The ratio of reference-to-signal beams should be adjusted to approximately 3 to 1.

Figure 7:
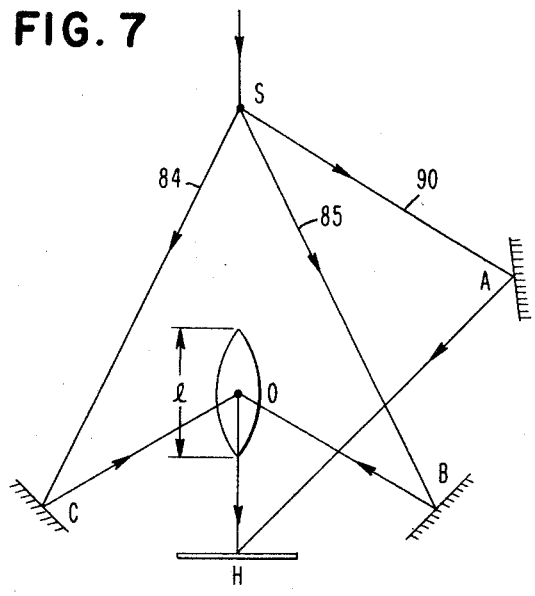

In order to record information about all points on the object being photographed, it is necessary that the light scattered from all object points interact with the reference beam to produce a well-defined interference pattern. This can occur only if the interacting wavefronts are coherent with each other. In FIG. 7, optical distance traveled by the central ray of the reference beam 90 in passing from the point of beam splitter S to the recording plane H has been measured and is represented by the length SAH. The optical distances traveled by the central ray in each of the illuminating beams 84 and 85 in going from the splitting point S to the center of the object O and then to the recording plane are made equal to each other (i.e., SBO equals SCO). If the system is aligned so that the total object ray distance SBOH equals SCOH and each is also equal to the reference beam distance SAH, then the wavefronts incident on the recording plane H will produce a strong interference pattern. This equality can be created for only one point on the object. Since the object to be recorded has a finite length $l$ in a direction perpendictular to the recording plane, all of the object rays will have a different length. For small angles, the difference between the maximum and minimum object rays will be approximately equal to $l$. Consequently for an exposure system set up as shown in FIG. 7, the difference between the object beam path and the reference beam path will vary between plus or minus $l$. Useful interference between these two beams, however, will occur only if their path difference is less than the coherence length of radiation from the source 80. In an exposure system set up in accordance with FIG. 6, the coherence length of the light source was measured to be 6 inches. The smallest model of a carrier commercially available was 10 inches long. Consequently, in using the exposure technique the entire length of the carrier cannot be recorded with equal brightness and fidelity. A smaller scale model of the carrier could be used but this is not desirable since less detail could be photographed.

Figure 8:
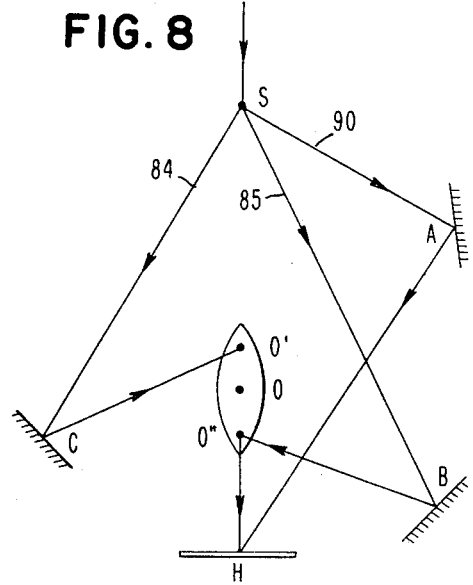

A modified exposure technique is shown in FIG. 8. In this arrangement the illuminating beams 84 and 85 are changed so that their central rays are directed to different segments of the model. Illuminating beam SBO″ illuminates the front half of the deck and SCO′ illuminates the rear half. The distances SBO″H and SCO'H are made equal to each other and to reference beam SAH by moving their respective mirrors. As far as each illuminating beam is concerned, it is interacting only with an object of length ½. This length is within the coherence length of the laser. In order to provide continuity, the beam diameters are adjusted to allow them to overlap in the central region.

Suggested systems

Four separate systems for generating and projecting an image will be discussed. Two of these systems use holographic techniques and two systems use conventional optics with a model of the real object. In all four cases, information generated by radar and data links as shown in FIG. 2 are utilized to manipulate various components to provide the 6 degrees of freedom required in the display system. In subsequent descriptions, two of the degrees of freedom indicated in FIG. 2, namely image pitch and image yaw, are equated to the expression "perspective" meaning the particular perspective view of the image in accordance with the vehicles position relative to the object on the approach path.

Holographic virtual image system

FIGS. 9, 10, 11 and 12 will be utilized to describe a holographic virtual image embodiment of an image generating and projection means including perspective selection means responding to the vehicles position relative to the object, and image translating means for manipulating the selected perspective in accordance with the vehicle's pitch, yaw, or roll.

Figure 9:
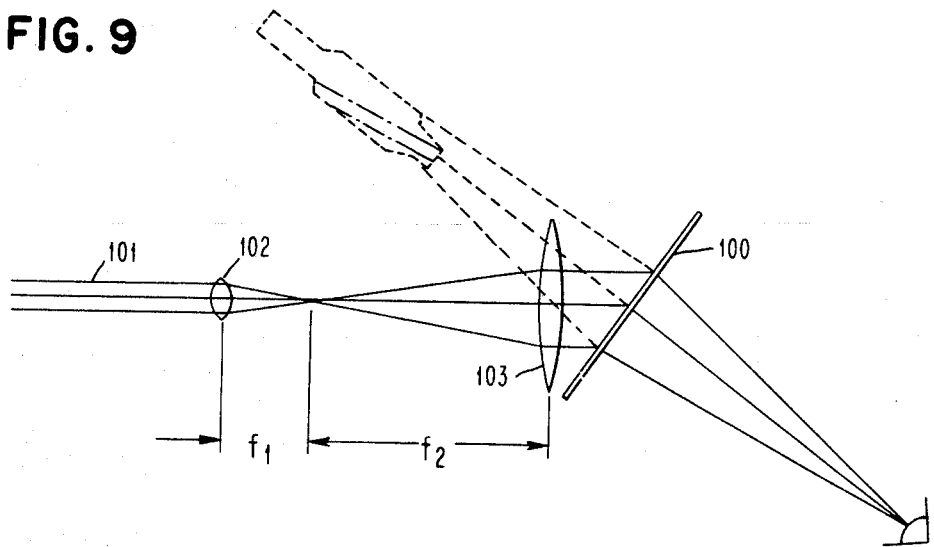
FIGS. 9 and 10 show a schematic representation of one way to alter the size of a virtual image reconstructed from a halogram.
Figure 10:
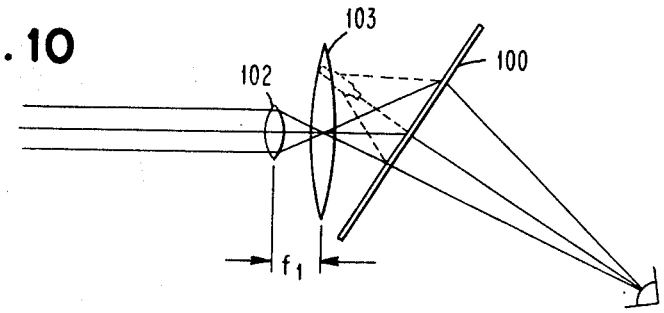

One of the degrees of freedom requiring manipulation is the size of the image displayed in accordance with the vehicles range to the object it is approaching. FIG. 9 and 10 show a mechanism for varying the size of a virtual image created from a hologram. To vary the size of the virtual image reconstructed from the hologram 100, the radius of the reconstruction reference beam 101 wavefront can be varied over a range from infinity to a few centimeters. The radius of the wavefront can be varied by varying the separation of a short focal length lens 102 and a long focal length lens 103. When the two lenses are separated by a distance equal to the sum of the two focal lengths ($f1+f2$), the light of the reconstruction beam 101 illuminates the hologram in a collimated fashion, when the wavefront has a very long radius. This is shown in FIG. 9. As lenses 102 and 103 are brought together, such as in FIG. 10, the radius of the wavefront shortens. The extreme is reached when the short focal length lens 102 touches the long focal length lens 103. By choosing focal lengths and lens diameters, one attempts to maintain the same illuminated area of the hologram 100 regardless of the radius of curvature of the reconstruction beam wavefront.

The pitch and yaw of an aircraft can be simulated by a spatial deflection of the virtual image in two directions. This deflection can be accomplished in a holographic manner by changing the reconstruction angle, which would require a rotation in space of the reconstruction reference beam about the intersection of the hologram plane and the reconstruction beam center line. In this rotation, the light intensity in the reconstructed image decreases. For the particular geometry used, this function goes to zero at approximately plus or minus 5°.

Figure 11:
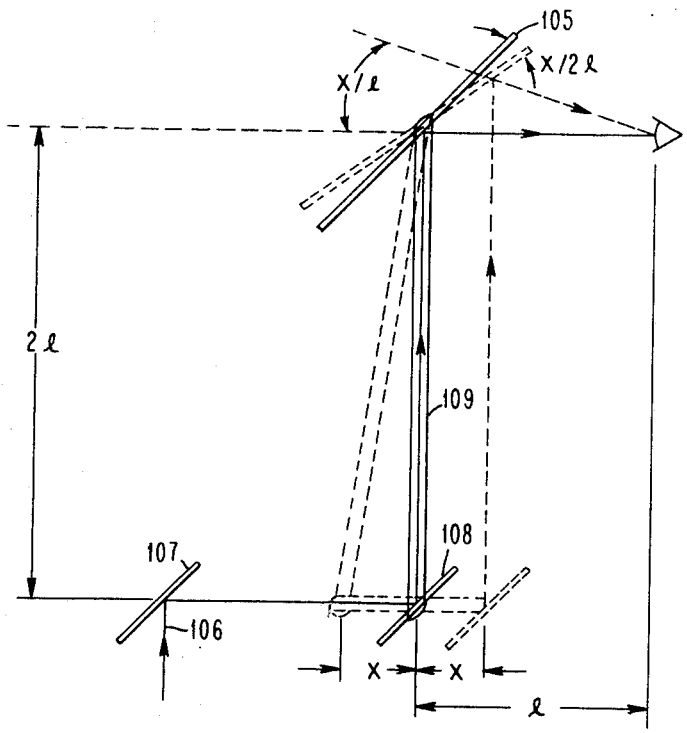
FIG. 11 shows a mirror with link mechanism to a beam splitter for controlling translation of an image in accordance with pitch or yaw of an aircraft.

A mechanical technique for creating the translation of a selected virtual image is shown in FIG. 11. The image to be viewed is incident on the beam splitter 105, which in turn reflects the light toward the pilot's eye. The mechanism in FIG. 11, shows the manner in which the projected image can be caused to be translated vertically in accordance with the pitch of the aircraft. The image beam 106 having the perspective and size dictated by the aircrafts position relative to the object is incident on a set of mirrors 107 and 108. Mirror 108 is connected to the beam splitter 105 by a likage 109. Mirror 108 is translated in accordance with information from the attitude signalling means indicating changes in pitch of the aircraft. As the mirror 108 is translated, the image beam is translated parallel to itself and the beam splitter 105 is rotated by a small angle to reflect the light beam back toward the pilot's eyes. The pilot will get the sensation that the light is coming from a position in space that is at an angle with respect to a straight-ahead position. If the distance from the beam splitter 105 to the pilot's eyes is $l$ and the distance that the beam is translated parallel to itself is $x$, then the beam splitter 105 must be rotated by an amount $x/2l$. The angle of simulated pitch is $x/l$. The mechanism in FIG. 11 shows a manner of translating the image for pitch. An additional set of mirrors 107 and 108 and the linkage 109 to the beam splitter 105 can be provided to produce the same translation to respond to changes in the aircraft's horizontal deviations, or yaw.

Figure 12:
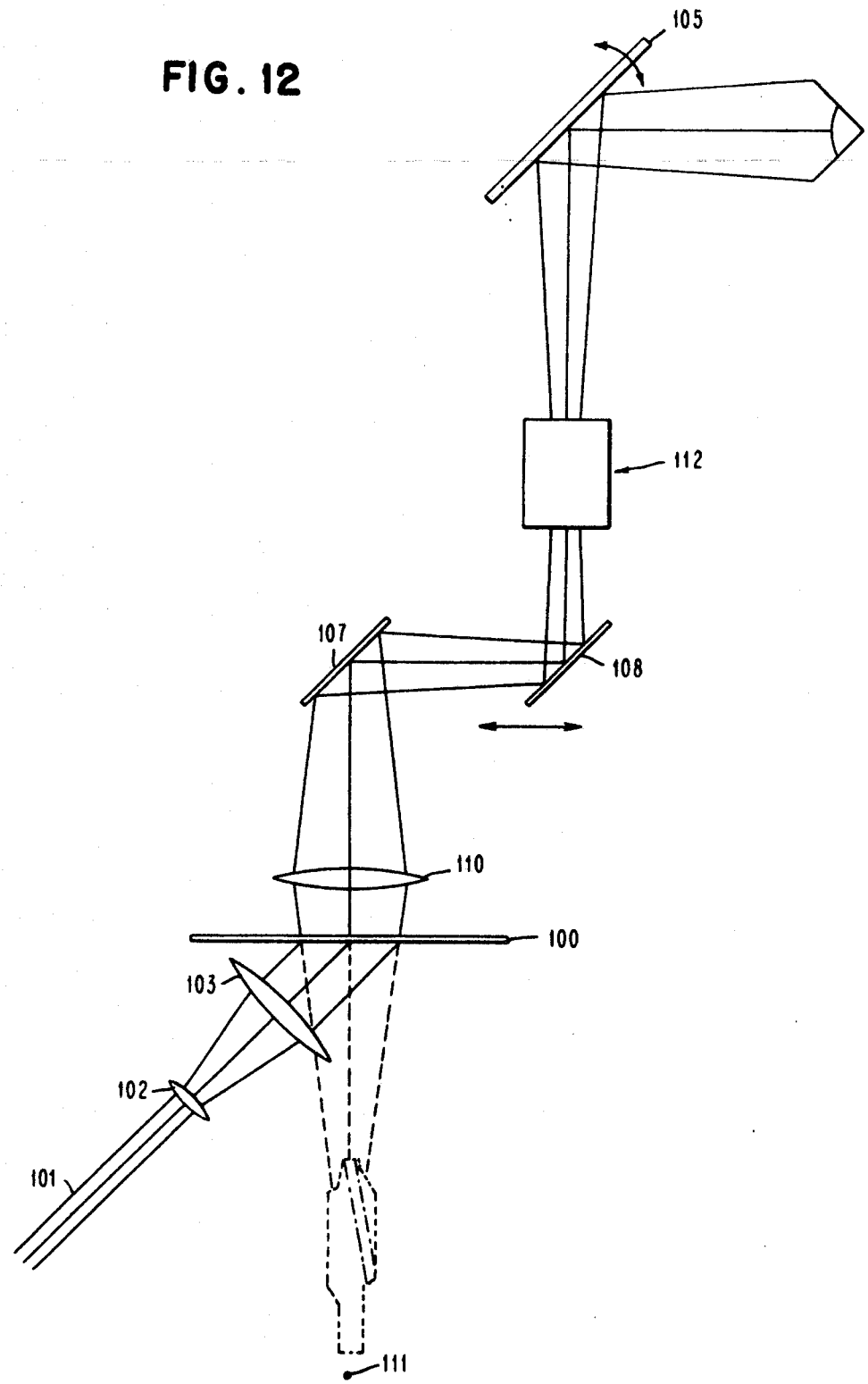
FIG. 12 shows a complete means for generating and projecting to an operator a virtual image reconstructed from a hologram.

A complete system for holographic virtual image generation and projection including perspective and size selection with image translation is shown in FIG. 12. The structure already referred to in FIGS. 9, 10 and 11 have been correspondingly numbered in FIG. 12. In looking at a virtual image one senses that the image is located behind the hologram 100. In order to maintain the pilot's eye accommodation for distance, this image must be projected to a distance of ten feet or greater. To do this, there is provided a long focal length lens 110 placed between the observer and the hologram 100. The holographic virtual image must be located just inside the focal length 111 of the lens as shown in FIG. 12. Adjustable lenses 102 and 103 which intercept the reconstruction beam 101 have been discussed previously. There is further shown in FIG. 12, a set of mirors 112, responding to yaw, corresponding to the set of mirors 107 and 108, responding to pitch. The set of mirrors 112 are linked to the beam splitter 105 in order to produce the translation of the projected image in the horizontal direction.

Responsive to information concerning image pitch and image yaw, as discussed in connection with FIG. 2, the proper area of the hologram 100 is illuminated to select the appropriate perspective view of the virtual image. With reference to FIG. 5, should a perspective be desired along the line of sight 70, the reconstruction beam 101 would be directed to that area of the hologram 100 which would produce that particular virtual image. To do this, the hologram 100 is translated in vertical and horizontal directions to bring the reconstruction beam 101 to the proper area of the hologram. The beam which creates the virtual image, such as the line 70 in FIG. 5, must be mechanically or optically translated back to the optical axis of the remainder of the projection system such that the virtual image selected can be projected through the lens 110. The remaining degree of freedom of the image which must be provided will be the roll condition of the aircraft. This is accomplished by rotating the hologram 100 and illuminating optics about the optical axis of the system.

Holographic real image system

In general, the image to be displayed must be removed to infinity to reduce the need for eye accommodation on the part of the vehicle operator. Because of the distances involved, the eye will be unable to determine whether or not the image at infinity is two or three dimensional. Consequently, the original image that is subsequently removed to infinity may be either two or three dimensional. In the holographic real image system, a two-dimensional real image will be produced with means to manipulate the image with the required degrees of freedom. FIGS. 13 through 21 will be utilized to describe the real image system.

FIGS. 4 and 5 were utilized to describe general aspects of holographic recording and reconstruction. When a real image is produced from a hologram, in accordance with FIGS. 4 and 5, certain adverse conditions result which present problems when trying to utilize the real image in a display system. In the system which uses a real image, adverse phase factors may be removed by illuminating the hologram for reconstruction with the conjugate of the referenced beam used during recording rather than using wavefront identical to the reference wave. That is, if a diverging reference beam is used in recording, then a converging beam will eliminate the adverse factors. Simply inverting the illuminating or reconstruction wavefront does not allow complete eliminatio of other adverse factors. Complete satisfaction of all adverse conditions is achieved if, at the same time the conjugate of the reference recording beam is used, the hologram is rotated 180°. When this is done, the illuminating or reconstruction beam wavefront becomes identical to the original reference beam except that all directions are reversed. This process is shown in FIGS. 13 through 16.

Figure 13:
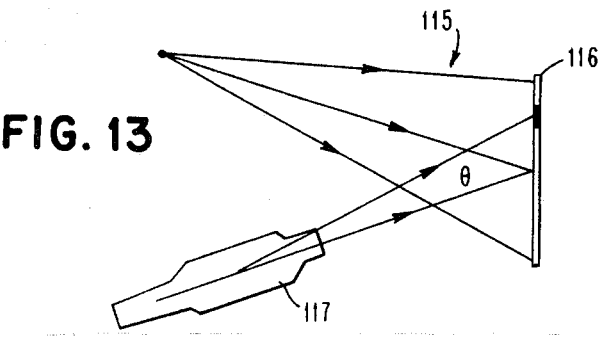
FIGS. 13 and 14 show a schematic representation of conventional means for producing a halographic recording and reconstruction for use with real image projection.
Figure 14:
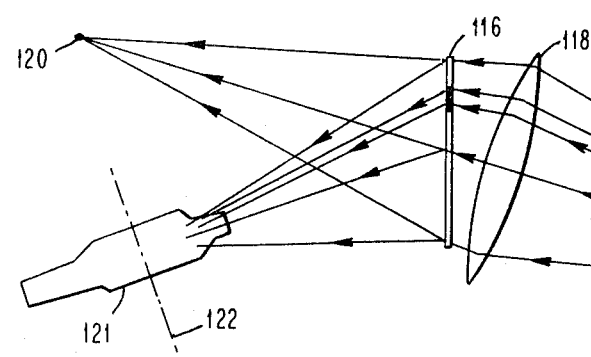

As shown in FIGS. 13 and 14, the reference beam 115 is simply the output of a microscope objective of sufficient power to fully illuminate the holographic record 116. The object 117 is located as shown. The illuminating reconstruction wavefront 119 must be the inverse of the recording reference wave 115 and, as shown in FIG. 14, must be obtained by using a large diameter lens 118 to image a point source through the hologram 116 back onto the original referenced point location 120. During reconstruction therefore, the real image 121 will be produced and focused as shown in FIG. 14 to be intercepted and displayed by a screen 122.

Figure 15:
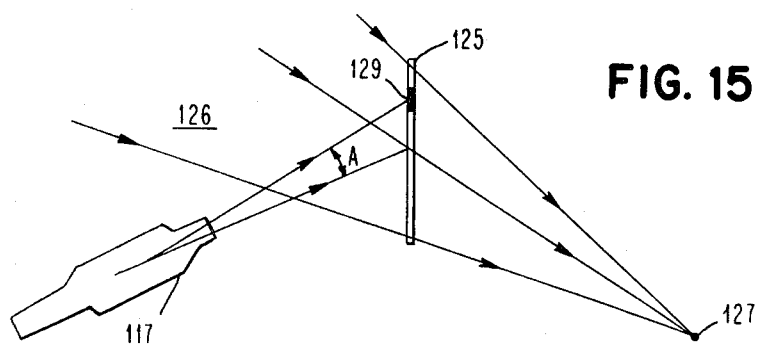
FIGS. 15 and 16 show a schematic representation of a modified means of holographic recording and reconstruction of a real image.
Figure 16:
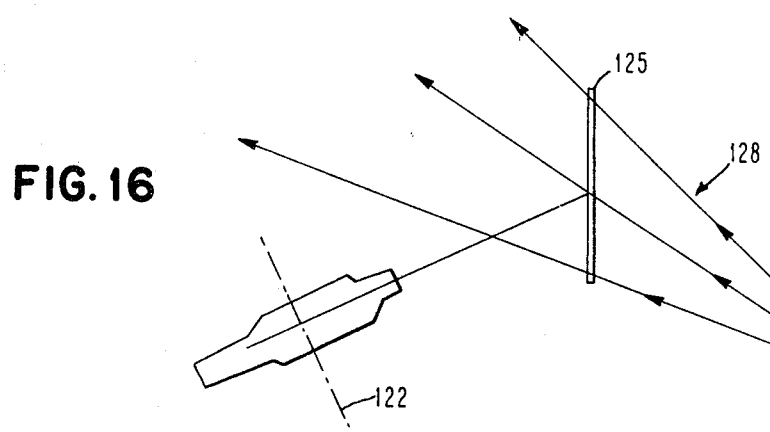

To eliminate the need for the large lens 118 shown in FIG. 14, a modified recording and reconstruction technique is shown in FIGS. 15 and 16. In this method, the hologram 125 is recorded with a converging reference beam 126 from a lens such as lens 118 in FIG. 14. The referenced beam 126 converges to a point 127. In read out, therefore, only a diverging reconstruction beam 128 emanating from a point 127 is required. In this way the requirements are reduced to one large lens that is used only in the recording and not in the reconstruction process.

An individual sub-area of the hologram 125 will receive information only about a particular view of the object 117. In the case of the shaded area 129 in FIG. 15, the recorded view would correspond to what an observer would see in looking through a window of area 129 located at an angle A relative to the center line of the deck of the model 117. There is, therefore, a unique perspective view of the carrier associated with each area element of the hologram 125. If the illumination is restricted to only a small area in the reconstruction process, the real image formed on a screen 122 represents the corresponding view that was recorded in that area. In the case of the area 129, the image that would be seen on a screen 122 would have a perspective of the model as seen from the angle A. As each different area is interrogated during reconstruction, the resulting view would change accordingly. The screen 122 on which the real image is displayed can be positioned so that there will be no translation of the image associated with the change in perspective. The technique shown in FIGS. 15 and 16 allow the means for selecting the real image so as to display any change in the aircraft's position relative to the object.

Figure 17:
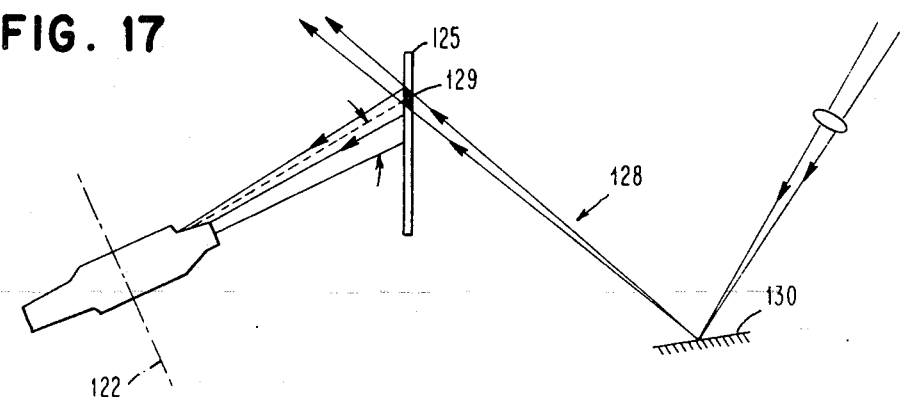
FIG. 17 is a schematic representation of the manner in which the proper perspective view in selected for a holographic real image display.

FIG. 17 shows a simple mechanism for selecting the area 129 on a holographic record 125 to display the proper perspective on a screen 122. A mirror 130 is placed in the path of the reconstruction beam 128. The mirror 130 is pivotable about two axes and would be controlled by the image pitch and image yaw information developed in FIG. 2 in accordance with the position of the aircraft relative to the aircraft carrier.

Figure 18:
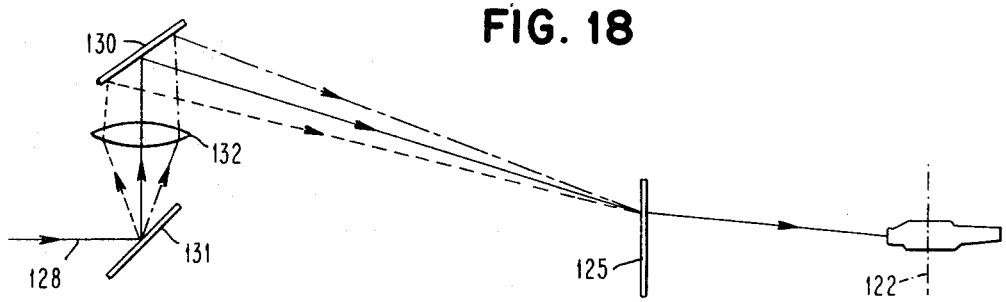
FIG. 18 is a schematic representation of the manner in which pitch and yaw image translation can be combined with image selection in a holographic real image display.

FIG. 18 depicts a manner in which the properties of the hologram can be utilized for supplying image motion required to simulate the pitch and yaw motion of the aircraft. In general, these degrees of freedom manifest themselves as a translation of the image in two dimensions. In theoretical discussions of holographic reconstruction, it is shown that a reconstruction image can be moved by changing the angle at which the reconstruction read out beam is incident on the hologram. In FIG. 18, there is shown the holographic record 125, and the previously mentioned perspective selection mirror 130. A further mirror 131 and lens 132 intercept the reconstruction beam 128 to provide for changing the angle at which the reconstruction beam 128 is incident on the area selected by the mirror 130.

Figure 19:
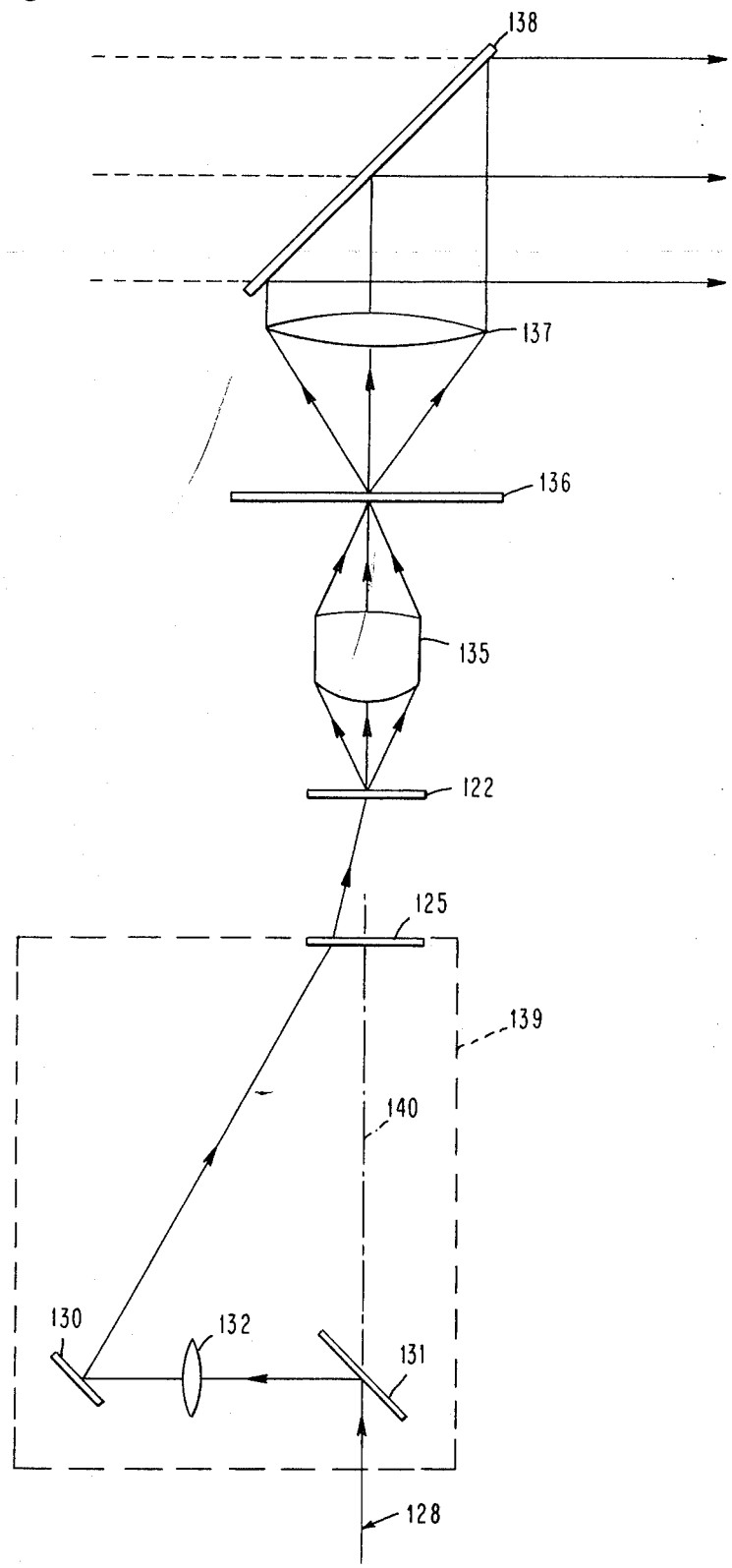
FIG. 19 is a schematic representation of one manner in which a complete holographic real image display can be implemented.

FIG. 19 shows an entire display system utilizing holographic real image techniques discussed in connection with FIGS. 17 and 18. Components of the system already discussed have been numbered with like designations. Thus, there is shown the holographic record 125, the reconstruction beam 128 being intercepted by the pitch and yaw translation mirror 131 and lens 132, the perspective selection mirror 130, and the screen 122 intercepting the original real image. Two remaining degrees of freedom remain to be discussed. Range information provided by the data link is utilized to adjust a zoom lens system 135 to provide variable magnification of the image on screen 122. This magnified real image corresponding to range-to-object information is then projected to a further screen 136. A collimating lens 137 projects the final image from screen 136 to a beam splitter 138 for projecting the image to the vehicle operator. One final degree of freedom which must be provided is roll of the image in accordance with the aircraft's roll attitude. To accomplish this rotation of the image, the mechanism contained within the dotted area 139 is rotated about the axis 140 in accordance with roll information provided by the aircraft's attitude reference system. Rotation axis 140 must be normal to the holographic plate 125 plane and pass through the reconstruction image on the screen 122. Since the pitch and yaw controls cause the image to translate, the axis of rotation 140 will not always pass through the image. An alternate approach for obtaining roll translation of an image is shown in FIG. 20 wherein conventional optics is inserted in the path of the light coming from the zoom lens 135 shown in FIG. 19.

Figure 20:
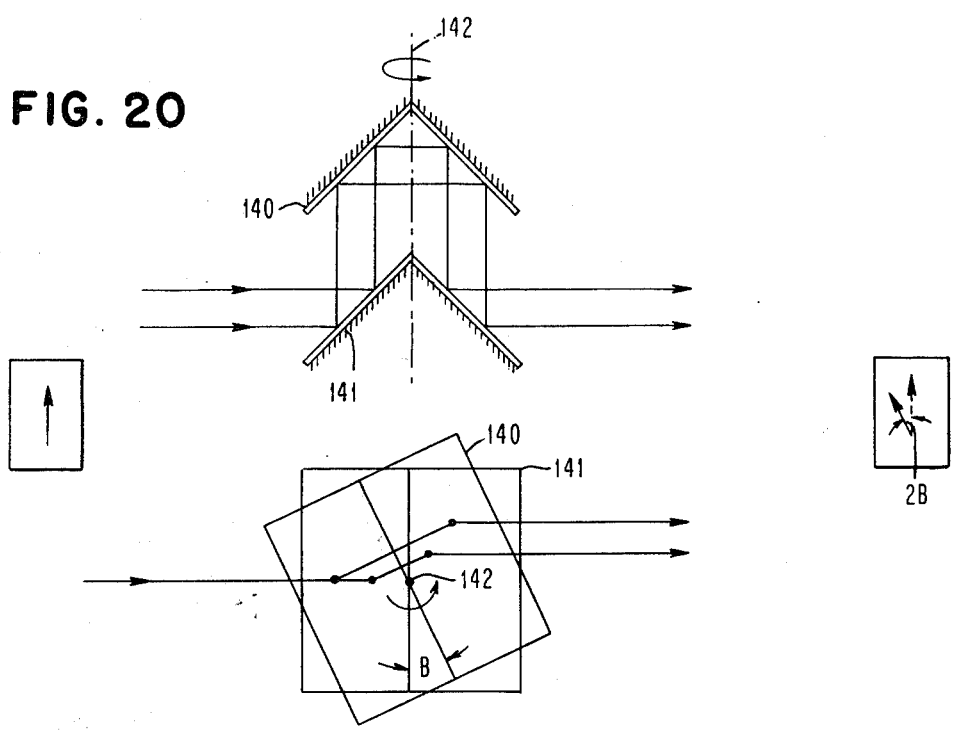
FIG. 20 is a schematic representative of a manner in which a holographic real image can be manipulated to provide roll information.

The device shown in FIG. 20 is similar to a dove prism in operation, and can be fabricated from a set of mirrors. One possible arrangement, as shown in FIG. 20, consists of two mirror sets 140 and 141, the mirrors of each set are at right angles to each other. The bottom set of mirrors 141 is fixed. The upper set of mirrors 140 is mounted so that it can rotate about a vertical axis 142 through the center of the intersection of the bottom mirrors 141. A rotation of the upper set of mirrors 140 by an angle B causes the observed image to rotate by an angle 2B as shown in the ray diagram.

Figure 21:
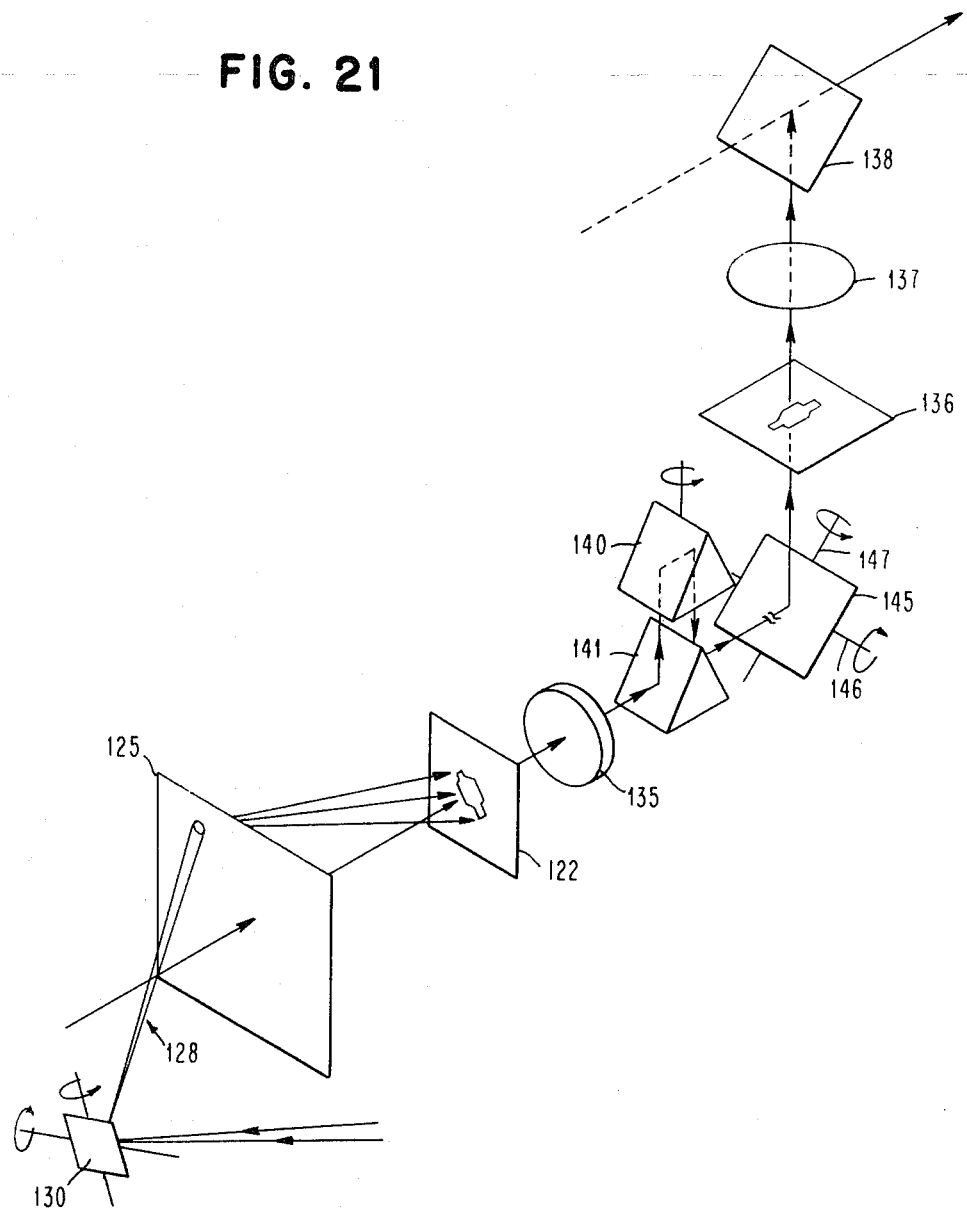
FIG. 21 depicts another complete system for generating and projecting a holographic real image for display.

FIG. 21 shows the manner in which the mechanism of FIG. 20 can be incorporated into the holographic real image display system and further shows a modification to the system to achieve pitch and yaw motion of the image, eliminating the need to rotate the mechanism within the box 139 of FIG. 19. In FIG. 21, components of the system previously discussed have been given the same designations. The set of mirrors 140 and 141 are shown intercepting the magnified image from the zoom lens 135. After rotation by the mirrors 140 and 141, the image bundle is made incident on a further reflecting mirror 145 rotatable on axes 146 and 147. Rotation of the mirror 145 translates the image presented to the screen 136 in accordance with pitch and yaw of the aircraft.

Optical display system

Figure 22:
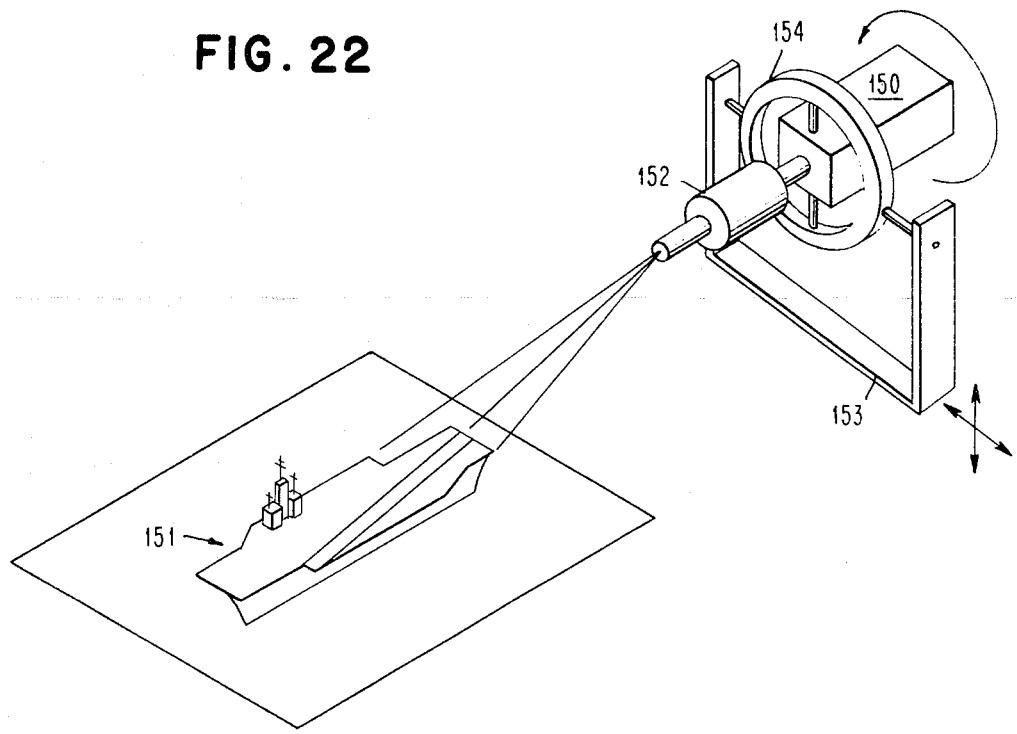
FIG. 22 is a schematic representation of another embodiment of the invention wherein television pick-up of a model generates and projects an image.
Figure 23:
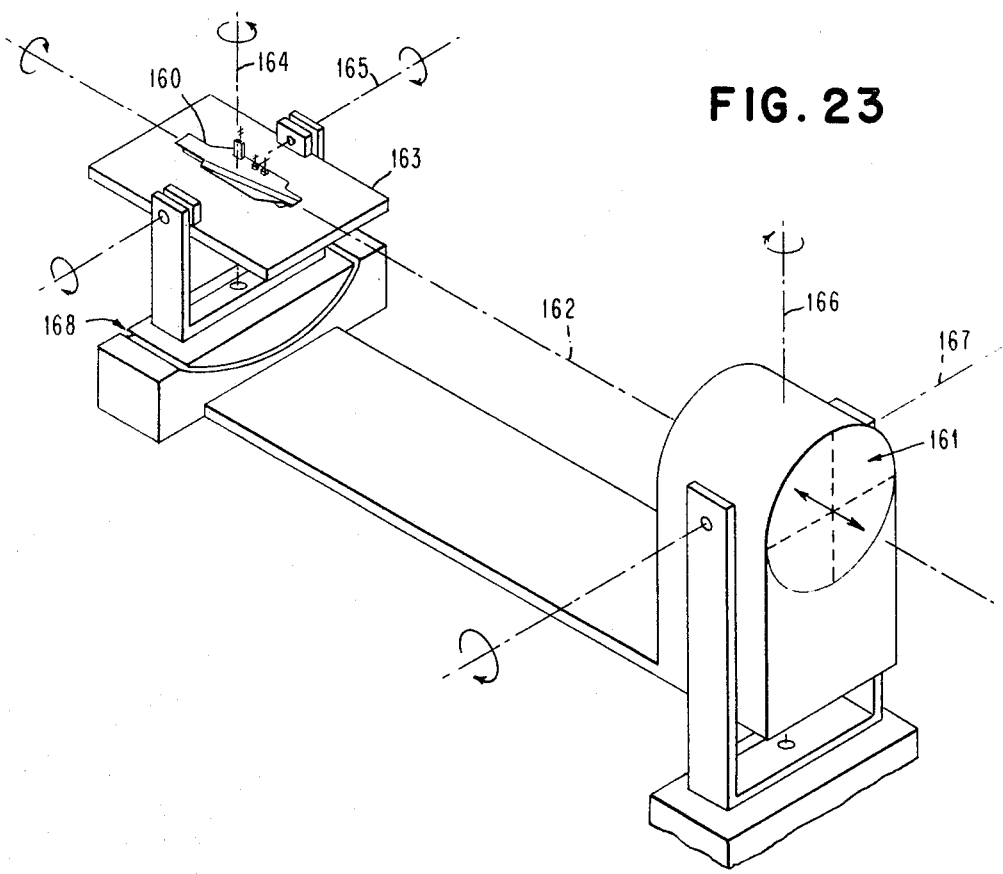
FIG. 23 is another embodiment of the present invention wherein conventional optics and mounting means for a model provide the means for generating the 6 degrees of freedom of an image.
Figure 24:
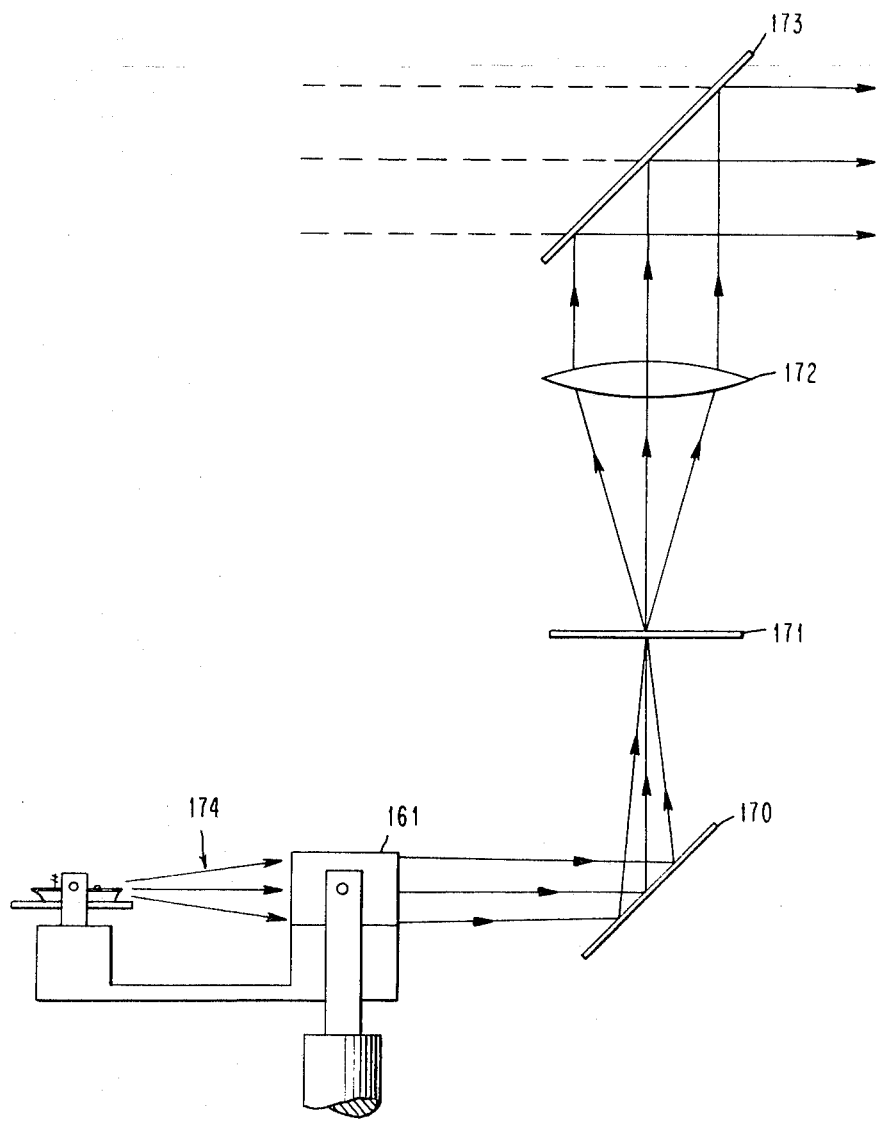
FIG. 24 is a complete display system for generating and projecting an image by conventional optics.

FIGS. 22, 23, and 24 will be utilized to describe further embodiments of the present invention which utilizes standard optical image generating and projection means. In both of these systems, an actual scale model of a real-world object is utilized with manipulation of the optics and/or the model to achieve the 6 degrees of freedom previously discussed. The mechanism shown in FIG. 22 includes as the basic apparatus a television camera 150 and an actual scale model of the real-world object such as the previously mentioned aircraft carrier 151. This mechanism can either be contained in the aircraft or on the aircraft carrier itself. The image generated and projected is received in the aircraft for projection to the previously mentioned beam splitter in the line of sight of the aircraft operator. Achievement of the 6 degrees of freedom will now be discussed. A zoom lens 152 is provided on the camera 150 to respond to range-to-object information to change the magnification of the image being projected. Selection of the perspective view of the model to be projected is accomplished in response to the information concerning image pitch and image yaw as mentioned in FIG. 2, by translating the camera 150 in a vertical or horizontal direction. This can be achieved by translating the frame member 153 in tracks not shown in either vertical or horizontal directions as shown by the arrows. To achieve translation of the image projected in accordance with pitch and yaw of the aircraft, a gimbal mechanism 154 mounts the camera 150 on the frame member 153. The final degree of freedom for translation of the image to be projected is roll information which is achieved by rotating the camera 150 on its optical axis.

To add additional realism in this system, the carrier model 151 could also be mounted in a gimbal arrangement. The model could then be made to pitch, yaw and roll with respect to the camera exactly as the real ship is doing with respect to some fixed frame of reference.

FIGS. 23 and 24 show one final version of a display system utilizing optical techniques. Once again, a model of a real object 160 is utilized. The optical system includes a zoom lens system 161 to change magnification of an image projected in accordance with range information. Image pitch and image yaw information, in accordance with the aircraft's position relative to the real object, are utilized to rotate the model platform 163 on a gimbal arrangement. The gimbal arrangement rotates the model 160 on axes 164 and 165 to change the perspective view of the model presented to the projection system. Both of these axes are perepndicular to the optical axis 162. The effect of the aircraft's pitch and yaw appears as a translation of the image in the field of the wind screen. The optical zoom lens system 161 and carrier model 160 with gimbal mounting are an integral unit. When this system is pivoted about the center of the lens 161, the carrier 160 remains on the optic axis 162 of the lens. The entire optic axis, however, moves and thereby changes the location of the projected image on the viewing screen. The axes of rotation for image translation are shown at 166 and 167.

The last degree of freedom required, roll, is seen by the vehicle operator as an angular tilt of the model 160. This is accomplished by including an additional gimbal on the carrier model support 163. This gimbal is such as to allow the model 160 to be rotated about the optic axis 162 so that the perspective view is not altered. This is shown in FIG. 23 where both the model 160 and gimbal axis 164 and 165 are mounted on a rocker type gimbal 168 whose center of curvature is on the optic axis 162.

FIG. 24 shows an entire system utlizing the optical system of FIG. 23. The image produced by the lens system 161 is projected to a mirror 170 which thereafter projects the image to a viewing screen 171. A collimating lens 172 further projects the image to the beam splitter 173 for viewing by the operator. One final modification to this optical system can be made wherein the entire optical system 174 can be held stationary and translation of the image in accordance with pitch and yaw of the aircraft cn be accomplished by mounting the mirror 170 for rotation on two perpendicular axes.

There has thus been shown four embodiments of image generating and projection means including perspective and size selection and image translation for a head-up display system. All four embodiments, respond to radar and data communication links to display to the vehicle operator a view of the real object having a size, perspective, and location on his line of sight corresponding exactly to the real object. Two embodiments shown utilize holographic techniques for generating and projecting the image. Two other embodiments utilize optical techniques for projecing an image developed from a scale model of the object being approached. In all four embodiments, the image displayed to the operator is manipulated with 6 degrees of freedom to provide an image which corresponds to the vehicle operator's real-world of interest.

What is claimed is:

1. A head-up display system for presenting to a vehicle operator, an image that appears at virtual infinity in front of the vehicle corresponding to the view of a real three-dimensional object, the vehicle having a normal approach path to the object and positional attitude, the display system including in combination:
   image generating and projection means, including a single interference pattern record of a model of the object and a reconstruction light source for illuminating said record to thereby create an image of the model, and further including a beam-splitter in the operator's normal line-of-sight, providing a variable view of the three-dimensional object;
   approach path signalling means for indicating the vehicle's position relative to the object;
   attitude signalling means for indicating the vehicle's pitch, yaw or roll condition, if any;
   perspective and size selection means associated with said record and said reconstruction light source, responsive to said approach path signalling means for illuminating a portion of said record in accordance with the horizontal and vertical angular position of the vehicle relative to the object for projecting to said beam-splitter an image of the object having the perspective and size related to the vehicle's actual position relative to the object; and,
   image translating means associated with said image generating and projection means, responsive to said attitude signalling means for positioning the image selected by said perspective and size selection means on said beam-splitter in accordance with the vehicle's attitude changes.

2. A display system in accordance with claim 1 wherein:
   said interference pattern record is a holographic record; and
   said image generating and projection means creates a virtual image of the model and further includes;
       collimating lens means between said holographic record and the operator for projecting the virtual image towards the operator, said lens having a focal point longer than the distance to the virtual image and which creates an optical axis.

3. A display system in accordance with claim 2 wherein said perspective and size selection means further includes:
   adjustable lens means between said reconstruction light source and said holographic record, responsive to range-to-object information from said approach path signalling means, for varying the radius of the wavefront from said reconstruction light source to thereby vary the size of the virtual image.

4. A display system in accordance with claim 3 wherein said image translating means includes:
   first and second reflective means intercepting the image beam from said collimating lens to the operator, responsive to said attitude signalling, for translating the beam parallel to itself in accordance with the pitch or yaw, respectively, of the vehicle.

5. A display system in accordance with claim 4 wherein said image translating means further includes:
   means associated with said holographic record for rotating said record on said optical axis in accordance with the vehicle's roll condition.

6. A display system in accordance with claim 1 wherein:
   said interference pattern record is a holographic record; and said image generating and projection means creates a real image of the model and further includes;

image intercepting means between said holographic record and the operator for displaying the real image selected by said perspective selection means on an optical axis.

7. A display system in accordance with claim 6 wherein said perspective and size selection means further includes:

adjustable lens means between said intercepting means and the operator on the optical axis, responsive to range-to-object information from said approach path signalling means, for varying the size of the projected image.

8. A display system in accordance with claim 7 wherein said image translating means includes:

first reflective means said adjustable lens means and the operator, responsive to roll information from said attitude signalling means for rotating the image projected by said adjustable lens means; and second reflective means intercepting the image beam from said first reflective means, normally projecting the image beam at right angles to the optical axis towards the operator, said second reflective means being rotatably mounted and responsive to pitch or yaw information from said attitude signalling means for altering the angle of projection of the image to the operator in first or second directions respectively; and said image generating and projection means further includes;

further image intercepting means for displaying the image reflected by said second reflective means, and collimating lens means between said further image intercepting means and the operator having its focal point at said further intercepting means to thereby project said image to infinity.

9. A display system in accordance with claim 7 wherein said image translating means includes:

rotatable reflective means between said reconstruction light source and said view selection means, responsive to pitch or yaw information from said attitude signalling means for altering the angle at which said reconstruction light source strikes said holographic record to thereby translate the selected image in first or second perpendicular directions.

10. A display system in accordance with claim 9 wherein said image translating means further includes:

rotatable mounting means for said holographic record, said view selection means, said rotatable reflective means, and said reconstruction light source, responsive to roll information from said attitude signalling means, for rotating said rotatable means on an axis normal to the plane of said holographic record and intersecting the image on said image intercepting means.

References Cited

UNITED STATES PATENTS

| | | | |
|---|---|---|---|
| 2,027,530 | 1/1936 | Hammond | 343—112 |
| 2,959,779 | 11/1960 | Miller et al. | 343—6 |
| 3,212,082 | 10/1965 | Robinson et al. | 343—6 |
| 3,284,799 | 11/1966 | Ross | 343—6 |
| 3,383,679 | 5/1968 | Baird | 343—6 |
| 3,435,452 | 3/1969 | Kilpatrick | 343—6 |

FOREIGN PATENTS

| | | |
|---|---|---|
| 157,494 | 9/1952 | Australia. |
| 846,627 | 9/1960 | Great Britain. |

RODNEY D. BENNETT, JR., Primary Examiner

F. HUBLER, Assistant Examiner